United States Patent
Robinson et al.

(10) Patent No.: US 12,556,875 B1
(45) Date of Patent: Feb. 17, 2026

(54) SYSTEMS AND METHODS FOR DETERMINING ROOM IMPULSE RESPONSES

(71) Applicant: Meta Platforms Technologies, LLC, Menlo Park, CA (US)

(72) Inventors: Philip Robinson, Seattle, WA (US); Paul Thomas Calamia, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 198 days.

(21) Appl. No.: 17/828,667

(22) Filed: May 31, 2022

Related U.S. Application Data

(63) Continuation of application No. 16/818,681, filed on Mar. 13, 2020, now Pat. No. 11,350,232.

(51) Int. Cl.
*H04S 7/00* (2006.01)
*H04R 1/40* (2006.01)
*H04R 3/00* (2006.01)
*H04R 5/027* (2006.01)

(52) U.S. Cl.
CPC .............. *H04S 7/301* (2013.01); *H04R 1/406* (2013.01); *H04R 3/005* (2013.01); *H04R 5/027* (2013.01); *H04S 2400/11* (2013.01); *H04S 2400/15* (2013.01); *H04S 2420/01* (2013.01)

(58) Field of Classification Search
CPC .. H04S 7/301; H04S 2400/11; H04S 2400/15; H04S 2420/01; H04R 1/406; H04R 3/005; H04R 5/027
See application file for complete search history.

(56) References Cited

U.S. PATENT DOCUMENTS

| | | | |
|---|---|---|---|
| 8,208,647 B2 * | 6/2012 | Ahnert | G01H 7/00 381/59 |
| 11,112,389 B1 | 9/2021 | Robinson et al. | |
| 2009/0052680 A1 * | 2/2009 | Wang | H04S 7/305 381/59 |
| 2015/0163593 A1 * | 6/2015 | Florencio | H04R 3/002 381/92 |

* cited by examiner

*Primary Examiner* — Jason R Kurr
(74) *Attorney, Agent, or Firm* — Greenberg Traurig, LLP

(57) ABSTRACT

A system for determining a room impulse response of an environment is disclosed. The system includes one or more microphones configured to detect acoustic energy in an area, an input/output interface configured to connect to a network, and one or more processors coupled to a non-transitory computer-readable storage medium. The system is configured to identify a sound detected by the one or more microphones, retrieve a copy of the sound via the network, and determine a room impulse response of the area based on the sound and the copy of the sound.

20 Claims, 4 Drawing Sheets

SYSTEMS AND METHODS FOR DETERMINING ROOM IMPULSE RESPONSES

CROSS-REFERENCE TO RELATED APPLICATION

This application claims the benefit of priority under 35 U.S.C. § 120 as a continuation of U.S. Non-Provisional patent application Ser. No. 16/818,681, filed on Mar. 13, 2020, the disclosure of which is incorporated herein by reference in its entirety.

FIELD OF THE DISCLOSURE

The present disclosure relates generally to the field of audio signal processing. More particularly, the present disclosure relates to systems and methods for room impulse response determinations and applications.

BACKGROUND

The present disclosure relates generally to acoustic enhancement and adjustment technology. As one example, acoustic enhancement and adjustment technology may utilize a room impulse response (RIR) of a particular room, theater, or auditorium in order to enhance acoustical sounds. For example, a RIR may be used to generate a desired acoustical effect such as to virtualize a sound source positioned in the particular room, theater or auditorium.

SUMMARY

The subject matter of this disclosure is directed to systems and methods for determining room impulse responses (RIR). In some embodiments, the system includes one or more microphones, cameras, speakers, and/or a software algorithm to determine a RIR of a room in which the one or more microphones are located. The system provides for the ability to calculate a RIR for any environment in which the one or more microphones are located.

A system for determining a room impulse response of an environment is disclosed. The system includes one or more microphones configured to detect acoustic energy in an area, an input/output interface configured to connect to a network, and one or more processors coupled to a non-transitory computer-readable storage medium. The system is configured to identify a sound detected by the one or more microphones, retrieve a clean or dry copy of the sound via the network, and determine a room impulse response between the one or more microphones and a source of the sound based on the sound and the clean copy of the sound. In some embodiments, the system includes a memory device coupled to the one or more processors configured to store one or more room impulse responses for multiple areas. In some embodiments, the system is further configured to store the room impulse response of the area within the memory. In some embodiments, the system is further configured to derive a second room impulse response corresponding to a virtual sound source position.

In some embodiments, the system also includes headphones (e.g., two or more speakers) coupled to the one or more processors and configured to emit acoustical sounds. In some embodiments, the system is further configured to cause the headphones to emit acoustical sounds which are perceived to be coming from the virtual sound source position using the second room impulse response.

In some embodiments, the system is further configured to estimate a direction from which the sound was received by the one or microphones.

In another implementation, a wearable device includes one or more microphones configured to detect acoustic energy in an area, an input/output interface configured to connect to a network, and one or more processors coupled to a non-transitory computer-readable storage medium. The system is configured to identify a sound detected by the one or more microphones, retrieve a clean copy of the sound via the network, and determine a room impulse response between the one or more microphones and a source of the sound based on the sound and the clean copy of the sound.

In another implementation, a method of determining a room impulse response includes detecting, via one or more microphones, acoustical energy in a room, identifying, via one or more processors, the acoustical energy as a known sound signal, retrieving, via the one or more processors, a clean copy of the known sound signal via the network, and determining, via the one or more processors, a room impulse response of the room based on the a clean copy of the known sound signal and the locally recorded audio of the known signal. In some embodiments, the method further includes storing the room impulse response of the room within a database. In some embodiments, the method further includes localizing the sound within the room. In some embodiments, localizing the sound within the room comprises determining, via the one or more processors, a direction in which the sound was received by the one or more microphones. In some embodiments, the method further includes deriving additional RIRs using the first calculated RIR and direction of arrival information of sound sources. In some embodiments, these additional RIRs represent the sound paths from virtual sound sources (which do not exist in the environment) to the listener, and can be used to present virtual sound sources binaurally over headphones.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
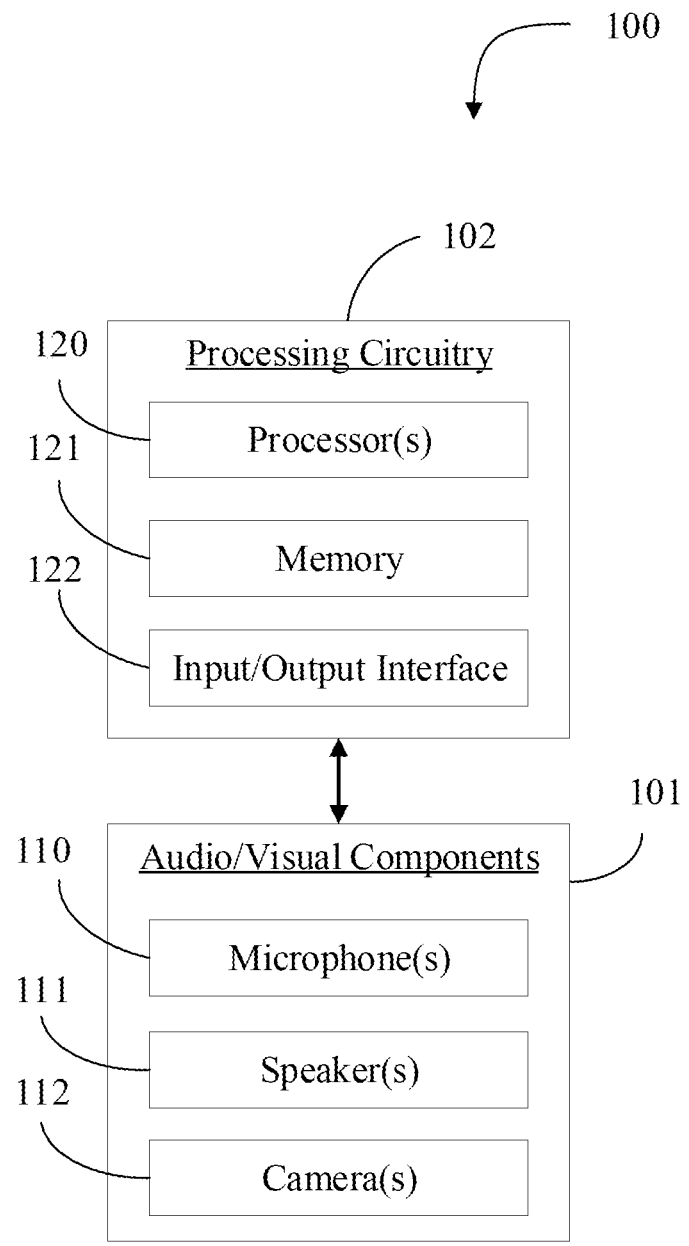
FIG. 1 is a block diagram of a room impulse response (RIR) system in accordance with an illustrative embodiment.

Referring generally to the FIGURES, systems and methods for room impulse responses (RIR) are shown, according to some embodiments. A RIR system is configured to calculate, determine, or otherwise estimate a room impulse response (RIR) of a particular room, area, or environment from an existing sound source location to the device wearer. The RIR system includes processing circuitry connected to various audio/visual components. The various audio/visual components include a microphone. In some embodiments, the various audio/vision components may include more than one microphone, one or more cameras, and/or one or more speakers. The microphone is communicably coupled to the processing circuitry that includes one or more processors.

The RIR system detects acoustical energy from a surrounding environment and analyzes the detected acoustical energy for known sounds (e.g., signal opportunities). For example, known sounds may include a known television programming, ambient music, projected music, or any sound that may have a clean recording that is stored within an accessible database. The RIR system downloads, retrieves from local memory, or otherwise retrieves via a network (e.g., via the internet) an electronic (i.e., clean or dry) copy of the known sound from the database. For example, the RIR system may analyze the detected acoustical energy, identify a song that is playing in the background within the detected acoustical energy, and download from a database an original, clean, or dry recording of the song.

The RIR system may then perform a variety of operations, processes, or methods using the original or clean electronic copy of the known sound and the detected known sound to determine a RIR of the environment where the microphone detected the song. In some embodiments, the RIR system may de-convolve the clean electronic copy (e.g., original electronic recording) from the known sound detected via the microphone in order to determine the RIR of the environment (e.g., a room or area). In some embodiments, the RIR system may also determine a location of an audio source (e.g., speaker) that emitted the known sound within the environment. For example, in some embodiments, the RIR system may utilize one or more cameras (e.g., that are connected on the same device as the microphone) to determine the location of the source within the environment. In some embodiments, the RIR system may estimate the direction of arrival using one or more audio localization techniques, methods, or operations in order to determine or estimate the location of the audio source.

In some embodiments, the RIR is used to enhance an acoustical projection of an audio output (e.g., via one or more speakers of the audio/visual components) to a user (e.g., a listener). For example, in some embodiments, the RIR may be used to extrapolate a second RIR that allows for the headphones to emit sounds from a virtual sound source position different than the location of the actual (original) sound source. That is, the second RIR can be convolved or otherwise mixed with a received signal (e.g., an audio signal of a real or virtual person speaking to the user via telecommunication) in order to create an audio effect (e.g., perceived by the user) of the person speaking from a position within the environment. In this way, the RIR systems and methods disclosed herein provide for RIRs to be determined for any room, area, or environment dynamically and in-real time. The RIRs may then be utilized for a variety of audio enhancing effects.

In some embodiments, the RIR system may be implemented in various form factors. For example, the RIR system, or a portion thereof, may be implemented in the form of a worn device such as a head wearable device, mobile device, smart watch, or other device that a user may be carrying. In some embodiments, the worn device may include glasses, goggles, or other head wearable device. Further, the RIR system may be implemented or connectable to various electronic devices. For example, the RIR system may be implemented with a virtual reality (VR) system, augmented reality (AR) system, or mixed reality (MR) system. In some embodiments, the RIR system may be implemented with electronic devices such as game consoles, server systems, personal computers, or telecommunication systems.

Referring now to FIG. 1, a block diagram of an RIR system 100 is shown. The RIR system 100 may include various audio/visual components 101, and processing circuitry 102. The audio/visual components 101 include microphone 110. In some embodiments, the audio/visual components 101 may include two or more microphones 110, one or more speakers 111, and one or more cameras 112. In some embodiments, the audio/visual components 101 are located on one device (e.g., a mobile or wearable device). In some embodiments, the audio/visual components 101 may be located on one or more devices that are in communication with one another. The microphone 110 is positioned and configured to sense or detect acoustical energy in an environment (e.g., room or area) in which the microphone 110 (e.g., and associated device) is located. In some embodiments, the RIR system 100 and/or audio/visual components 101 are part of a, a VR, AR, or MR console, or a wearable display.

The processing circuitry 102 may include a processor 120, a memory 121, and an input/output interface 122. In some embodiments the processing circuitry 102 may be integrated with various electronic devices. For example, in some embodiments, the processing circuitry 102 may be integrated with a wearable device such as a head worn display, smart watch, wearable goggles, or wearable glasses. In some embodiments, the processing circuitry 102 may be integrated with a gaming console, mobile device, wearable display, wearable device, personal computer, server system, or other computational device. In some embodiments, the processing circuitry 102 may also include one or more processors, application specific integrated circuit (ASICs), or circuitry (e.g., such as buffers, analog to digital converters, filters, etc.) that are integrated with the audio/visual components 101 and are designed to cause or assist with the RIR system 100 in performing any of the steps, operations, processes, or methods described herein.

The processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries, processes and/or firmware. In some embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some embodiments, the memory 121 is configured to also store, within a database, recorded sounds, clean electronic recordings of various sounds, songs, television programs, podcasts, etc. The processing circuitry 102 can include converters, signal processing circuits, filters, and other interface elements in the analog domain and/or the digital domain. In some embodiments, the memory 121 may include a database located and integrated with the RIR system 100. In some embodiments, the memory 121 may include a database that is connected via a network (e.g., on the cloud or within a server system)

In some embodiments, input/output interface 122 of the processing circuitry 102 is configured to allow the processing circuitry 102 to communicate with the audio/visual components 101 and other devices (e.g., a server system having a database of clean or original recordings). In some embodiments, the input/output interface 122 may be configured to allow for a physical connection (e.g., wired or other physical electrical connection) between the processing circuitry 102 and the audio/visual components 101. In some embodiments, the input/output interface 122 may include a wireless interface that is configured to allow wireless communication between the audio/visual components 101 (e.g., an ASIC, integrated circuit (IC), or processor connected or located with the audio/visual components 101) and the processing circuitry 102. The wireless communication may include a Bluetooth, wireless local area network (WLAN) connection, radio frequency identification (RFID) connection, or other types of wireless connections. In some embodiments, the input/output interface 122 also allows the processing circuitry 102 to connect to the internet (e.g., either via a wired or wireless connection). In some embodiments, the input/output interface 122 also allows the processing circuitry 102 to connect to other devices such as a display, external audio system, multiple audio/visual components 101, or other devices.

It should be noted that various other components can be included in the RIR system 100 that are not shown for sake of clarity of the present embodiments. These can include various power and/or signal conditioning components such as analog to digital converters, buffers, multiplexers, transistors, etc. Such additional components can be included in either the audio/visual components 101 or the processing circuitry 102 as appropriate for the particular embodiment.

Figure 2:
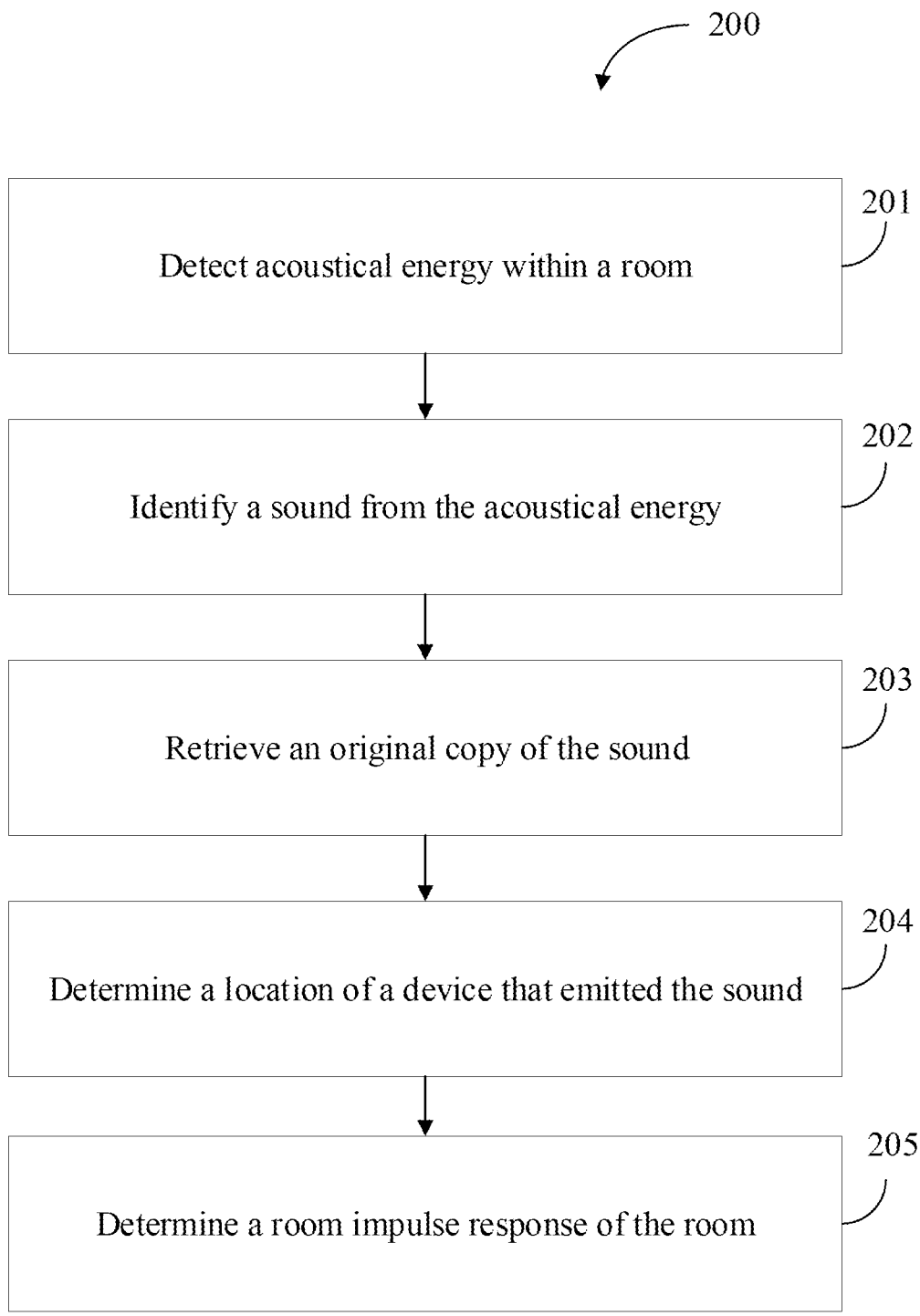
FIG. 2 is a flow diagram of a method of determining an RIR in accordance with an illustrative embodiment.

Referring now to FIG. 2, a flow diagram of a method 200 of determining an RIR is shown in accordance with an illustrative embodiment. The method 200 includes detecting acoustical energy within an environment, identifying a known sound from the acoustical energy, retrieving a clean recording (e.g., copy) of the sound, and determining the RIR for the environment.

In operation 201, acoustical energy within an environment is detected. In some embodiments, one or more microphones 110 of an RIR system 100 may detect, monitor, or sense acoustical energy within the environment and generate a corresponding electrical signal that is indicative of the acoustical energy. The corresponding electrical signal may then be filtered, buffered, and/or converted into digital format.

In operation 202, a sound from the acoustical energy is identified. For example, the sound may include a known sound such as a song, a podcast, a television program, or any other sound that may have a recording. In some embodiments, the RIR system 100 processes the electrical signal produced by the microphone 110 in order to identify the sound. For example, in some embodiments, one or more Fast Fourier Transforms (FFT) may be taken of the electrical signal and pattern matched to known sounds (e.g., stored within a database either locally or within the cloud) in order to identify the sound. In some embodiments, the RIR system 100 may process multiple electrical signals (e.g., generated from corresponding microphones) before identifying the sound. In some embodiments, the RIR system 100 may process each of the multiple electrical signals separately or use only one of the electrical signals to identify the sound. In some embodiments, an application (e.g., Shazam®) may be utilized to identify the sound.

In operation 203, a clean recording of the sound is retrieved. For example, the RIR system 100 may download an original or clean recording of the sound after the RIR system 100 identifies the sound. In some embodiments, the RIR system 100 may access the recording of the sound from a local memory. For example, the RIR system 100 may identify that the recording has already been downloaded to local memory (e.g., stored within songs or an application) on the RIR system 100 and access the recording from the local memory. In some embodiments, the RIR system 100 may request to download the recording from a third party (e.g., Spotify® or other music libraries). In some embodiments, the RIR system 100 may request and download the recording from a database located within the cloud controlled by either a provider of the RIR system 100 or third party.

In operation 204, a location of a device or other source that emitted the sound is determined. In some embodiments, the RIR system 100 may estimate the location of the device (e.g., loudspeaker) that emitted the sound. In some embodiments, the RIR system 100 may use direction of arrival estimations, video, etc. to determine the location of the device. In some embodiments, the RIR system 100 may implement beamforming (e.g., between the electrical signals of two or more of the microphones) to estimate the signal from a given direction. For example, in some embodiments, the RIR system 100 may access one or more cameras 112 and process the images from the cameras 112 to determine the location of the device or other source that emitted the sound from the RIR system 100 (e.g., microphone 110). In some embodiments, the image from the camera 112 may be processed to determine the make and model of the device that emitted the sound. In such embodiments, the make and model of the device may be used to download, access, or retrieve information about the device such as directivity pattern and frequency response to correct or adjust the RIR.

In some embodiments, information about the environment may already be known. For example, a database may store a layout or design of a multiple environments that can be accessed by the RIR system 100. Additionally, location information from the RIR system 100 may be known or accessed via a global positioning system (GPS) or other positioning system in order to determine the location of the RIR system 100 (e.g., the microphone 110). In such an embodiment, the RIR system 100 may determine the location of the device that emitted the sound relative to the RIR system 100 (e.g., the microphone 110) via the accessed layout of the environment and the known location of the RIR system 100.

In operation 205, an RIR of the environment is determined based on the original or clean recording and the identified sound. For example, the identified sound may be stored within memory or a buffer and have a duration of time (e.g., 30 seconds between a given starting and ending point of a song or portion thereof). The RIR system 100 may process one or both of the identified sound and its retrieved recording to align in time to the identified sound such that the same duration of time in both are aligned in order to determine the RIR. In some embodiments, the RIR system 100 may de-convolve the recording from the identified sound (e.g., sound recorded from the environment) to yield the RIR from the location that the sound was emitted to the position of the microphone.

In some embodiments, the RIR from the device to the RIR system 100 may be uploaded and stored within a database. In some embodiments, the RIR from the device to the RIR system 100 may include information about the location of the device that emitted the sound within the room. In some embodiments, the uploaded and stored RIR may be accessed by future devices for future applications.

In some embodiments, the RIR from the device to the RIR system 100 may be used to extrapolate a second RIR based on a difference between the location of a virtual sound source and the location that was used to determine the first RIR. The second RIR may be used by the RIR system 100 to generate a sound (e.g., via speakers 111) at a virtual sound source in the environment to a listener. For example, in some embodiments, the RIR system 100 may be implemented as a head wearable display. The head wearable display may be receiving audio and/or visual signals from a source (e.g., via telecommunication or from a programming source). Thus, the RIR from the device to the RIR system 100 may be extrapolated in order to generate the second RIR that will allow the device's loudspeakers to project the received audio signals as a sound that will be perceived by the listener to come from a virtual sound spot within the environment. In some embodiments, the virtual sound spot may correspond to a virtual location of a virtual person that is speaking with the listener (e.g., wearer of the head wearable device). In some embodiments, the sound is projected at the virtual sound spot via convolving the second RIR with the received audio signals. In some embodiments, the projected sound is emitted by two or more loudspeakers 111 controlled using binaural signals.

Figure 3:
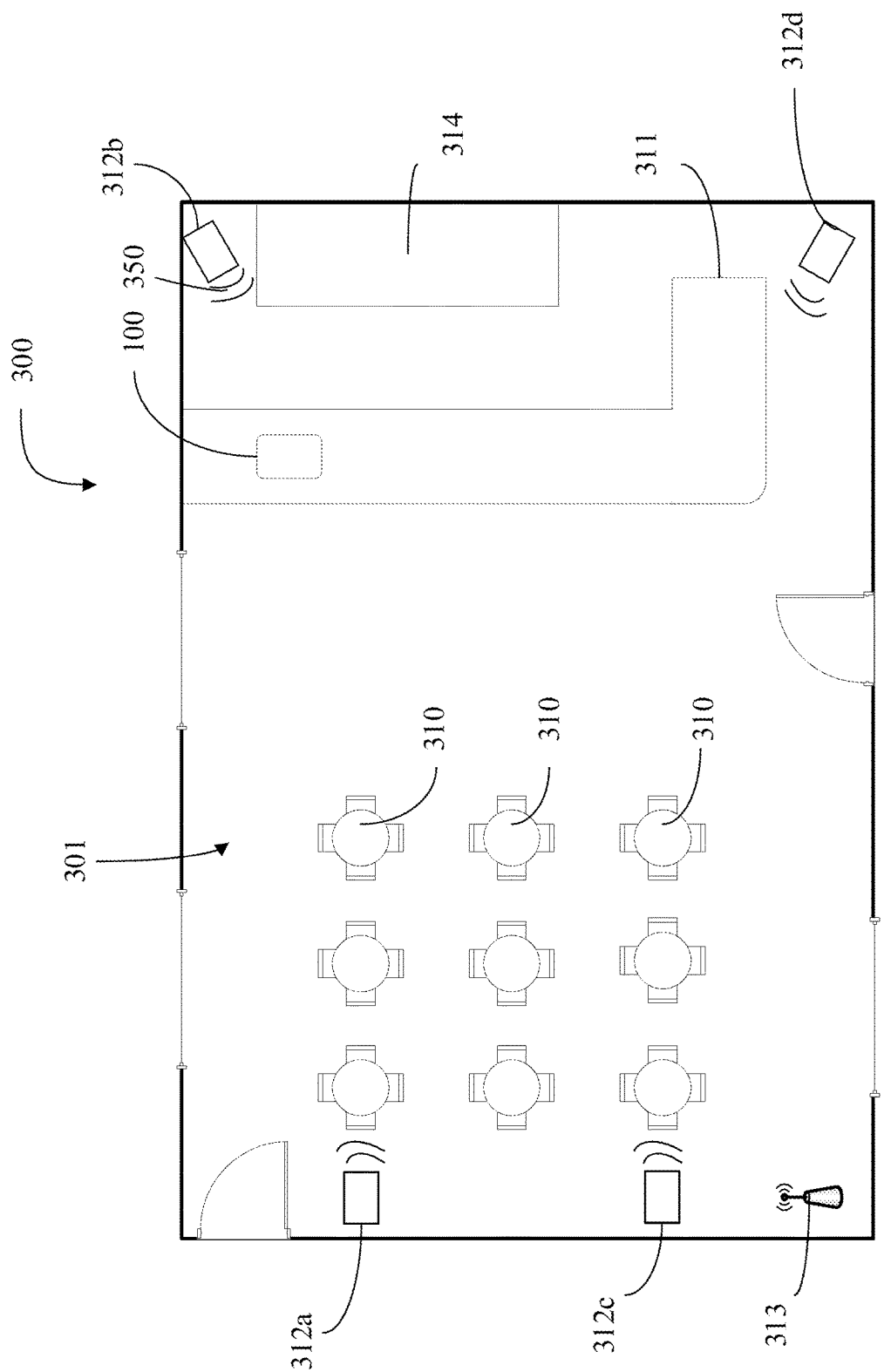
FIG. 3 is a diagram of an environment in accordance with an illustrative embodiment.

Referring now to FIG. 3, a diagram 300 of an environment is shown in accordance with an illustrative embodiment. In particular, the diagram 300 depicts a room 301 (e.g., a restaurant or bar) and a RIR system 100 located within the room 301. The room 301 includes multiple tables 310, a bar top 311, shelving 314, multiple loudspeakers 312a-d, and wireless access point 313. In some embodiments, the room 301 may also include a television, radio, stereo, or other device that is configured to project a sound via one or more of the multiple loudspeakers 312a-d. In some embodiments, for example, the RIR system 100 may be embodied as a mobile device or a wearable device. The RIR system 100 may be connected to the internet via the wireless access point 313 and/or a cellular network.

The multiple loudspeakers 312a-d are configured to project acoustical energy (e.g., sound 350) into the room 301. The sound 350 will bounce and echo off of the walls, windows, tables 310, bar 311, and shelves 314 within the room 301 until the sound 350 reaches one or more microphones of the RIR system 100. The one or more microphone of the RIR system 100 may detect the sound 350 (and other sounds generated in the room) and generate a corresponding electrical signal that is indicative of the acoustical energy in the room. The electrical signal may then be processed, filtered, converted into digital form, and/or buffered and processed to determine whether the sound 350 is a known sound. A known sound may include a podcast, television program, or song. For example, in some embodiments, the sound 350 that is projected by one or more of the multiple loudspeakers 312a-d includes a song (e.g., Your Song by Elton John). The RIR system 100 may recognize that song (e.g., known sound) and identify that a clean recording is available to access either within memory or retrieve from a database via the internet. The RIR system 100 may then download, retrieve, or otherwise access the recording of the sound.

In some embodiments, the RIR system 100 may determine a location of a source that emitted the sound 350. In some embodiments, the RIR system 100 may use beamforming, direction of arrival, or cameras to determine the location of the loudspeaker 312b that that emitted the sound 350. In some embodiments, the RIR system 100 may filter the electrical signals produced by the one or more microphones to localize the sound to the loudspeaker 312b that emitted the sound that was detected by the one or more microphones with the highest signal to noise ratio. An RIR of the room from the loudspeaker 312b to the RIR system 100 may be calculated by de-convolving a retrieved recording corresponding to the sound 350 from the (e.g., filtered) signals generated by the one or more microphones. In some embodiments, the RIR of the room from the loudspeaker 312b to the RIR system 100 may be uploaded and stored for future access or used by the RIR system 100 to generate binaural or multi-channel audio signals to a listener (e.g., user of the device) at virtual sound positions. For example, FIG. 4 depicts an example of a virtual sound position.

Figure 4:
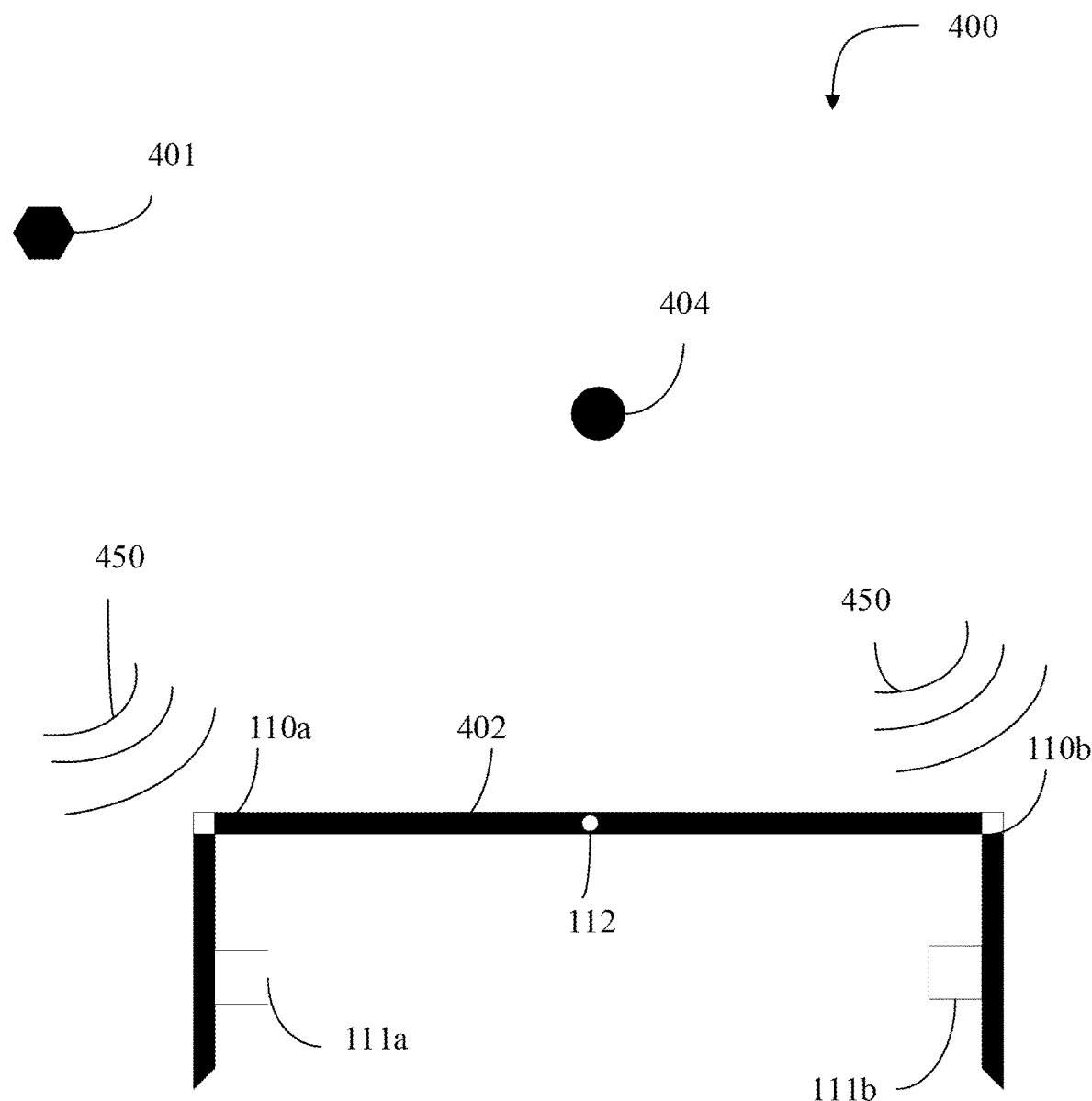
FIG. 4 is a diagram of a wearable device integrated with an RIR system is shown in accordance with an illustrative embodiment.

Referring now to FIG. 4, a diagram 400 of a wearable device having an RIR system is shown in accordance with an illustrative embodiment. The diagram 400 includes a device 401 emitting a sound 450 within an environment (e.g., a room), a wearable device 402 (e.g., glasses or eye box configured to be affixed to a head of a user), and a virtual sound position 404. The wearable device 402 includes a first microphone 110a, a second microphone 110b, a camera 112, a first speaker 111a, and a second speaker 111a. The device 401 emits a sound 450 that travels to the first and second microphones 110a and 110b, the time of arrival to each of the first and second microphones 110a and 110b may be used to determine the location (angle) of the device 401 relative to the wearable device 402. In some embodiments, beamforming or other direction of arrival techniques may be used to estimate the location of the speaker. The sound 450 may contain a known sound that the wearable device 402 can identify then access or retrieve a clean recording of the known sound from a database.

The camera 112 may be used to capture images or videos of the environment that can also be used to determine the location of the device 401 relative to the wearable device 402. The camera 112 may also be used to identify the make and model of the device 401 that can be used to access manufactures information regarding the device and used to correct any RIR calculated herein.

An RIR of the environment from the device 401 to the wearable device 402 may be calculated by de-convolving the recording corresponding to the detected sound (e.g., or portion of the recording) from the corresponding portion of the sound 450 that contains the known (e.g., locally recorded) sound. The RIR of the environment from the device 401 to the wearable device 402 can be extrapolated to create a second RIR that allows for the wearable device 402 to project audio signals (e.g., binaural audio signals) to a user of the wearable device 402 via the first speaker 111a and the second speaker 111b. For example, the second RIR may be determined by extrapolating the previously determined RIR of the environment from the device 401 to the wearable device 402 using a difference between the location used to previously determine the RIR of the environment from the virtual sound position 404 to the wearable device 402. The virtual sound position 404 may be determined by the wearable head device. In some embodiments, the virtual sound position 404 may have a default position (e.g., two feet directly in from of the wearable device). In some embodiments, the virtual sound position 404 may correspond to a virtual image position of a character or user being displayed to the user of the wearable device 402. The character or user being displayed to the user may be a person that is communicating with the user via telecommunication or may be a character or person in a video game, movie, or other cinematic performance.

The second RIR may be convolved with an audio signal in order to generate a binaural audio signal that can be projected by the first and second loudspeakers 111*a-b*. In this way, the audio signals (e.g., either received or intended for the user to hear) may be projected by the first and second loudspeakers 111*a-b* in a manner in which the user will perceive the source of the audio signals to be at the virtual sound position 404.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:
   one or more processors coupled to a non-transitory computer-readable storage medium having instructions encoded thereon that, when executed by the one or more processors, cause the one or more processors to:
   identify a known sound within a signal received via a microphone of an environment, wherein the known sound is determined to have a clean electronic copy accessible from a storage by matching to known sounds stored within the storage;
   access the clean electronic copy of the known sound from the storage; and
   determine a room impulse response of the environment based at least on the known sound and the clean electronic copy of the known sound.

2. The system of claim 1, wherein the clean electronic copy of the known sound is an original or dry recording of the known sound.

3. The system of claim 1, wherein the one or more processors de-convolves a recording from the known sound to yield the room impulse response from a location that the known sound was emitted to a position of the microphone.

4. The system of claim 1, wherein the one or more processors determine the room impulse response between the microphone and a source of the known sound and the clean electronic copy of the known sound.

5. The system of claim 1, wherein the one or more processors process one or both of the known sound and the clean electronic copy of the known sound to align in time to have a same duration of time.

6. The system of claim 1, wherein the one or more processors cause one or more speakers to emit the known sound, the known sound being detected by the microphone.

7. The system of claim 1, wherein the one or more processors determine a direction from which the known sound was received.

8. A method comprising:
   identifying, by one or more processors, a known sound within a signal received via a microphone of an environment, wherein the known sound is determined to have a clean electronic copy accessible from a storage by matching to known sounds stored within the storage;
   accessing, by the one or more processors, the clean electronic copy of the known sound from the storage; and
   determining, by the one or more processors, a room impulse response of the environment based at least on the known sound and the clean electronic copy of the known sound.

9. The method of claim 8, wherein the clean electronic copy of the known sound is an original or dry recording of the known sound.

10. The method of claim 8, further comprising processing, by the one or more processors, one or both of the known sound and the clean electronic copy of the known sound to align in time to have a same duration of time.

11. The method of claim 8, further comprising determining, by the one or more processors, the room impulse response between the microphone and a source of the known sound and the clean electronic copy of the known sound.

12. The method of claim 8, further comprising identifying the known sound by taking one or more Fast Fourier Transforms of the signal and pattern matching to the known sounds in a database.

13. The method of claim 8, further comprising causing, by the one or more processors, one or more speakers to emit the known sound, the known sound being detected by the microphone.

14. The method of claim 8, further comprising determining, by the one or more processors, a direction from which the known sound was received.

15. A device comprising:
   one or more processors communicatively coupled to a storage and one or more microphones, the one or more processors configured to:

identify a known sound within a signal received via the one or more microphones located in an environment, wherein the known sound is determined to have a clean electronic copy accessible from the storage by matching to known sounds stored within the storage;

access the clean electronic copy of the known sound via the storage; and provide a room impulse response of the environment using the sound and the clean electronic copy of the sound.

16. The device of claim 15, wherein the one or more processors are further communicatively coupled to one or more speakers and are further configured to cause the one or more speakers to emit the known sound.

17. The device of claim 15, wherein the one or more processors are further configured to retrieve the clean electronic copy of the known sound from the storage comprising memory coupled to the one or more processors.

18. The device of claim 15, wherein the one or more processors are further configured to identify the known sound by taking one or more Fast Fourier Transforms of the signal and pattern matching to the known sounds in a database.

19. The device of claim 15, wherein the one or more processors are further configured to determine a direction from which the known sound was received.

20. The device of claim 15, wherein the one or more processors are further configured to determine the room impulse response between the microphone and a source of the known sound and the clean electronic copy of the known sound.

* * * * *